(12) United States Patent
Manwaring et al.

(10) Patent No.: US 7,730,804 B2
(45) Date of Patent: Jun. 8, 2010

(54) CENTRAL LOCK DEVICE OF AN ADJUSTABLE STEERING COLUMN ASSEMBLY

(75) Inventors: Marvin V. Manwaring, Clio, MI (US); Richard K. Riefe, Saginaw, MI (US); Amelia M. Lask, Bay City, MI (US); Melvin L. Tinnin, Clio, MI (US); Ravi Ravindra, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 332 days.

(21) Appl. No.: 11/726,207

(22) Filed: Mar. 21, 2007

(65) Prior Publication Data

US 2008/0229865 A1 Sep. 25, 2008

(51) Int. Cl.
 *B62D 1/183* (2006.01)
 *B62D 1/184* (2006.01)
 *B62D 1/185* (2006.01)
 *B62D 1/187* (2006.01)

(52) U.S. Cl. ........................................ 74/493; 280/775
(58) Field of Classification Search .................. 74/493, 74/496, 497, 567, 569; 280/775
See application file for complete search history.

(56) References Cited

U.S. PATENT DOCUMENTS

| 4,472,982 | A | | 9/1984 | Nishikawa | |
|---|---|---|---|---|---|
| 4,709,592 | A | * | 12/1987 | Andersson | ................... 74/493 |
| 4,793,204 | A | * | 12/1988 | Kubasiak | ..................... 74/493 |
| 5,588,337 | A | | 12/1996 | Milton | |
| 6,237,439 | B1 | | 5/2001 | Weber et al. | |
| 6,481,310 | B2 | | 11/2002 | Janeczko et al. | |
| 6,540,429 | B2 | | 4/2003 | Weisgerber et al. | |
| 6,616,185 | B2 | * | 9/2003 | Manwaring et al. | ......... 280/775 |
| 6,659,504 | B2 | * | 12/2003 | Riefe et al. | .................. 280/777 |
| 6,695,350 | B2 | | 2/2004 | Uphaus et al. | |
| 6,729,007 | B2 | | 5/2004 | Weisberger et al. | |
| 6,857,660 | B2 | | 2/2005 | Manwaring et al. | |
| 6,863,306 | B2 | | 3/2005 | Bechtel et al. | |
| 7,093,855 | B2 | * | 8/2006 | Manwaring et al. | ......... 280/775 |
| 2005/0145056 | A1 | * | 7/2005 | Maida et al. | ................... 74/493 |
| 2007/0295145 | A1 | * | 12/2007 | Sekii et al. | ..................... 74/493 |
| 2008/0060467 | A1 | * | 3/2008 | Manwaring et al. | ........... 74/493 |
| 2008/0231030 | A1 | * | 9/2008 | Menjak et al. | .............. 280/775 |
| 2008/0231031 | A1 | * | 9/2008 | Manwaring et al. | ......... 280/775 |

\* cited by examiner

*Primary Examiner*—Richard W Ridley
*Assistant Examiner*—Terence Boes
(74) *Attorney, Agent, or Firm*—Cantor Colburn LLP (57) ABSTRACT

An adjustable steering column assembly of a vehicle has a central lock device for selectably locking an adjustable steering housing and co-extending steering shaft to a stationary bracket or chassis. For driver convenience and comfort, the steering housing and shaft are together adjustable with respect to the bracket. The lock device has an actuator preferably having an outer member supported operably by a guide feature carried between the outer member and the bracket for movement along a first centerline traverse to the steering shaft. The bracket also supports a lever of the actuator for movement along a second centerline that intersects the first centerline. At least one roller is located in a raceway defined between the outer member and the lever. Because the raceway is angled with respect to both the first and second centerlines, motion of the lever along the second centerline is converted to motion of the second member along the traversing first centerline.

8 Claims, 10 Drawing Sheets

CENTRAL LOCK DEVICE OF AN ADJUSTABLE STEERING COLUMN ASSEMBLY

FIELD OF THE INVENTION

The present invention relates to an adjustable steering column assembly for a vehicle, and more particularly to a central lock device of the adjustable steering column assembly having a push/pull actuator.

BACKGROUND OF THE INVENTION

Known adjustable steering column assemblies can be adjusted in a longitudinal or telescoping direction and in a tilt direction. Generally the longitudinal direction moves a steering wheel forward and rearward with respect to the vehicle and thus farther from or closer to the driver. The tilt direction generally moves and tilts the steering wheel in a vertical direction, thus closer or further away from a lap of the driver. To adjust the steering column assembly, the driver must first unlock a lock device before the steering column assembly will move. In some known assemblies, the tilt adjustment and the telescoping adjustment features each have its own lock device. In other known assemblies, a single lock device will release the assembly for both adjustments.

Unfortunately, the actuating levers of known lock devices are typically located on either the left or right hand sides of the steering column and actuated via a pivoting movement. This orientation and the required pivoting action limit packaging ability of the assembly and can restrict comfort and convenience for the driver. Moreover, known levers are typically mounted to a stationary bracket of the assembly and thus do not move with the steering wheel. Thus, relative to the steering wheel, the position of the lever changes and may not be ideally positioned through the adjustment range of the assembly.

SUMMARY OF THE INVENTION

An adjustable steering column assembly of a vehicle has a central lock device for selectably locking an adjustable steering housing and co-extending steering shaft to a stationary bracket or chassis. For driver convenience and comfort, the steering housing and shaft are together adjustable with respect to the bracket. The lock device has an actuator preferably having an outer member supported operably by a guide feature carried between the outer member and the bracket for movement along a first centerline traverse to the steering shaft. The bracket also supports a lever of the actuator for movement along a second centerline that intersects the first centerline. At least one roller is located in a raceway defined between the outer member and the lever. Because the raceway is angled with respect to both the first and second centerlines, motion of the lever along the second centerline is converted to motion of the second member along the traversing first centerline.

Objects, features and advantages of the present invention include an adjustable steering column assembly having a central lock device that enables a central orientation of a push/pull lever of the device. Moreover, because the lever actuates in a direction substantially parallel to the axis of the steering column and the toggle apparatus generally moves with the steering wheel, versatility in the overall packaging of the assembly is improved and operating convenience for the driver is enhanced.

DESCRIPTION OF THE DRAWINGS

These and other objects, features and advantages of this invention will be apparent from the following detailed description, appended claims, and accompanying drawings in which:

DETAILED DESCRIPTION OF THE PREFERRED EMBODIMENTS

Figure 1:
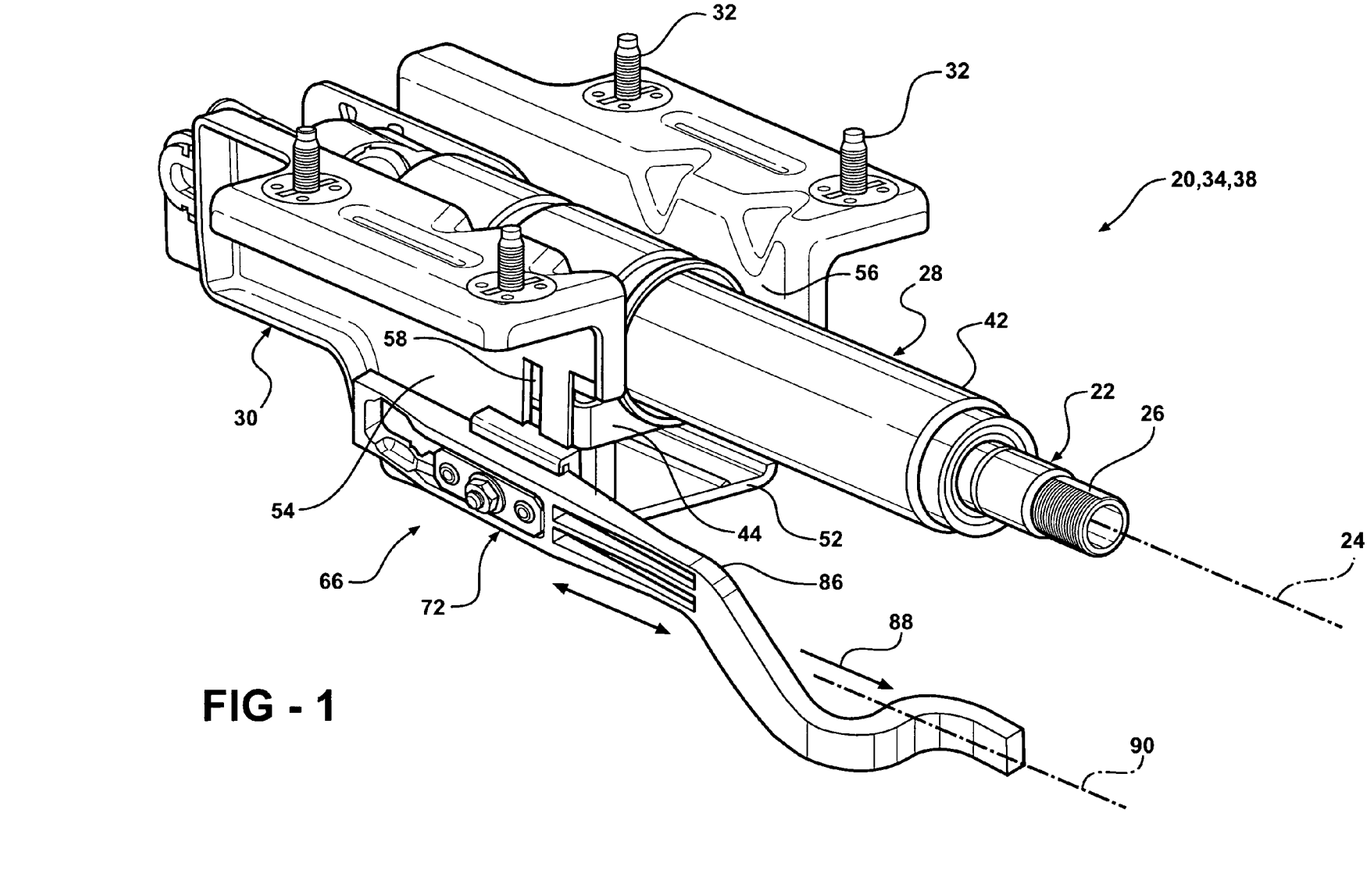
FIG. 1 is a perspective view of an adjustable steering column assembly of the present invention illustrated in a tilt down state and retracted position.

Referring now to FIG. 1 of the drawings, an adjustable steering column assembly 20 for a vehicle has a steering shaft 22 that projects rearward with respect to the vehicle and along a rotation axis 24 to a distal end 26 that attaches to a steering wheel (not shown). The steering shaft 22 is preferably journaled to and rotates within a tilt housing or steering column 28. The housing 28 is supported by a bracket 30 of the assembly 20 that engages rigidly to a chassis of the vehicle via a plurality of pins or threaded studs 32 that project preferably upward from the bracket 30 to engage the chassis. Although not generally illustrated, the pins 32 may be constructed and arranged to shear or break away from the chassis should the driver forcibly impact the steering wheel during a vehicle collision.

Figure 2:
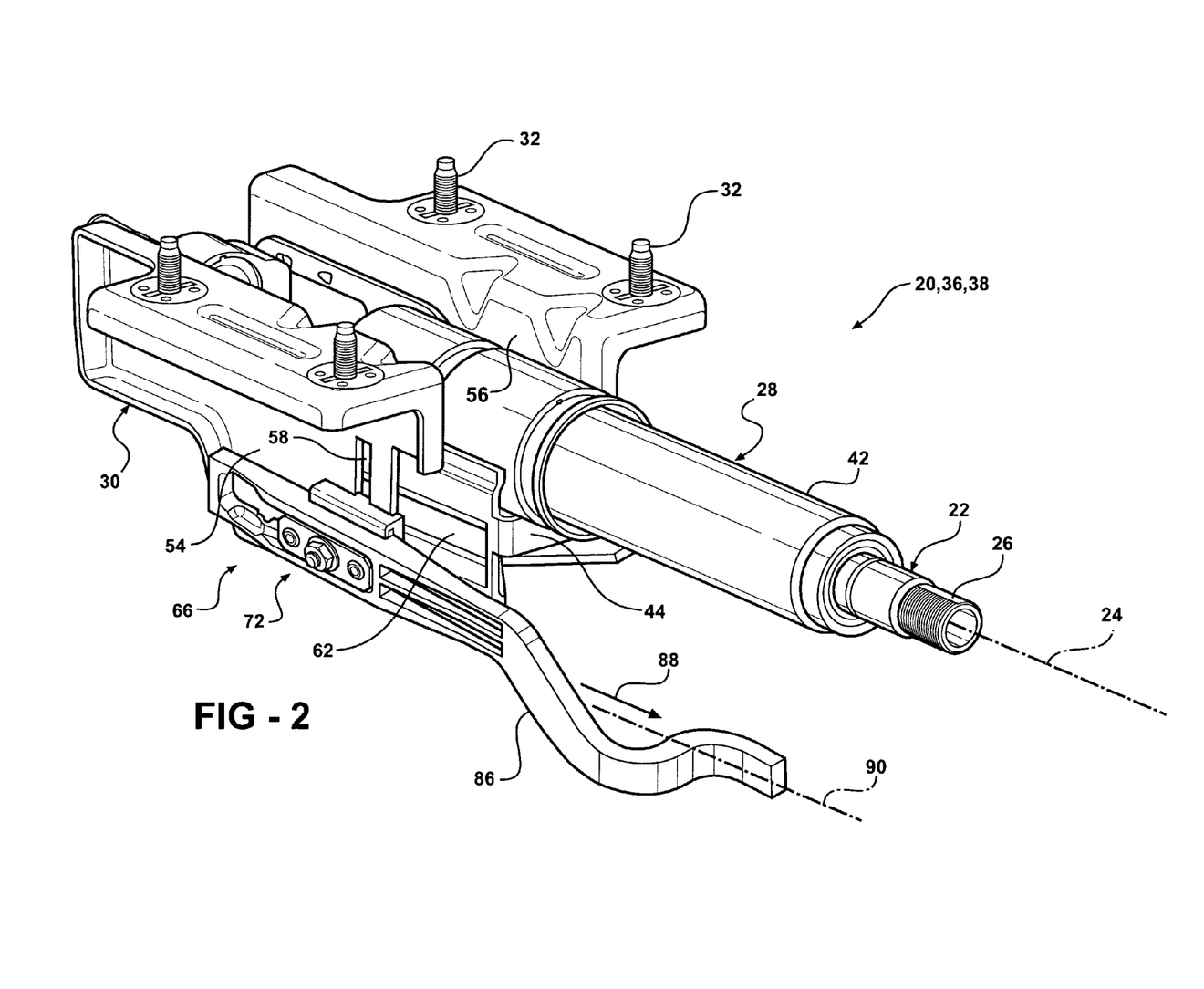
FIG. 2 is a perspective view of the adjustable steering column assembly illustrated in a tilt down state and extended position.

The housing 28 and co-extending shaft 22 are preferably constructed and arranged to extend and retract longitudinally as a single unit and with respect to the bracket 30 between a retracted position 34 (see FIG. 1) and an extended position 36 (see FIG. 2). When extending, the housing 28 and shaft 22 move in a linear rearward direction with respect to the vehicle, and when retracting, the housing 28 and shaft 22 move in a forward direction and generally into the bracket 30.

Figure 3:
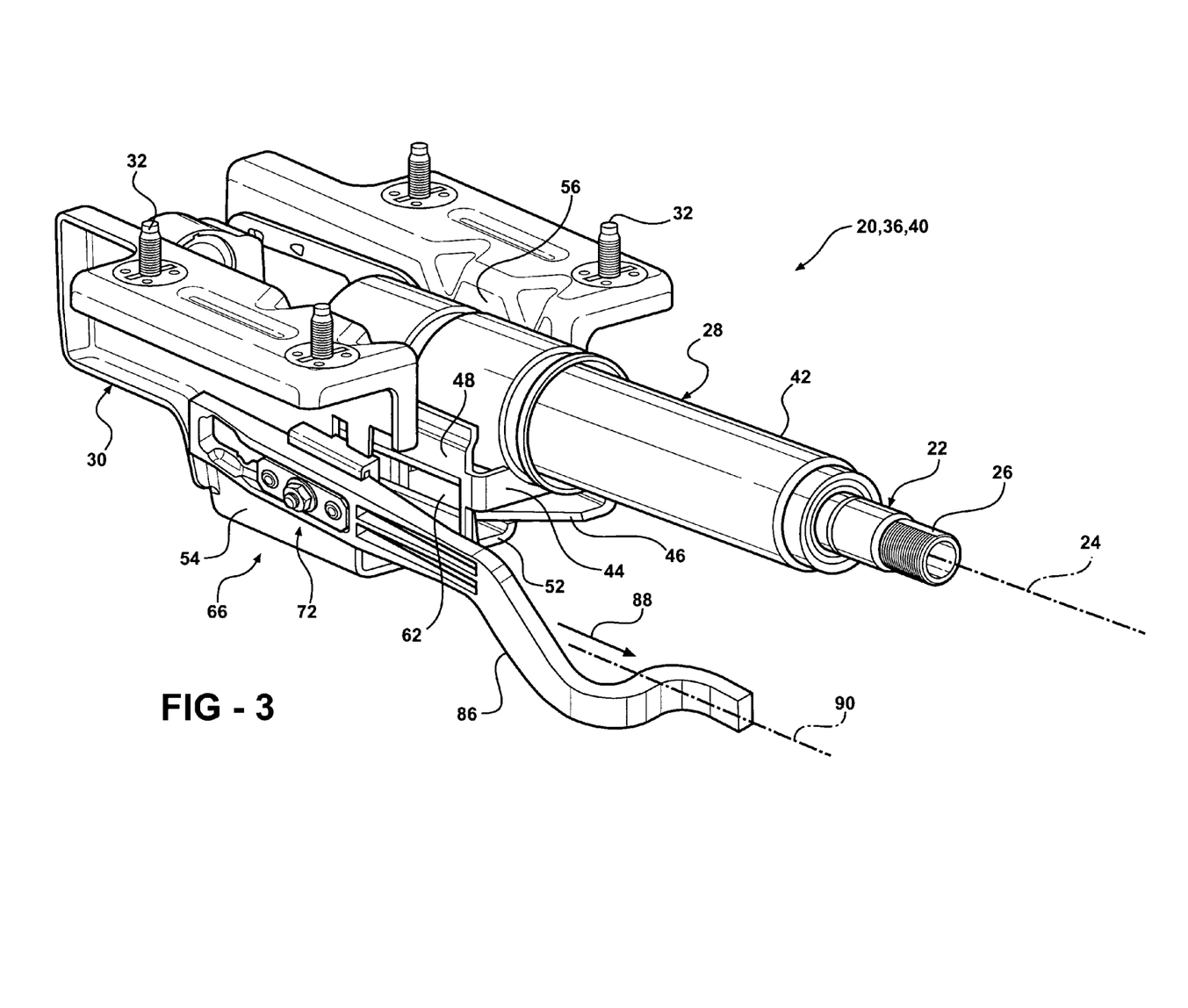
FIG. 3 is a perspective view of the adjustable steering column assembly illustrated in a tilt up state and extended position.

This forward and rearward movement, however, is not necessarily parallel to rotation axis 24 of steering shaft 22 because the housing 28 and shaft 22 are preferably constructed and arranged to tilt as a single unit between a rake or tilt down state 38 (see FIG. 1) and a rake or tilt up state 40 (see FIG. 3). This tilt adjustment moves the distal end 26 of the steering shaft 22 in an actuate and substantially vertical direction. To accommodate drivers of small stature, the housing 28 is generally extended near the extended position 36 and tilt down state 38. To comfortably accommodate drivers of larger stature, the housing 28 is generally retracted to near the retracted position 34 and the tilt up state 40.

Figure 4:
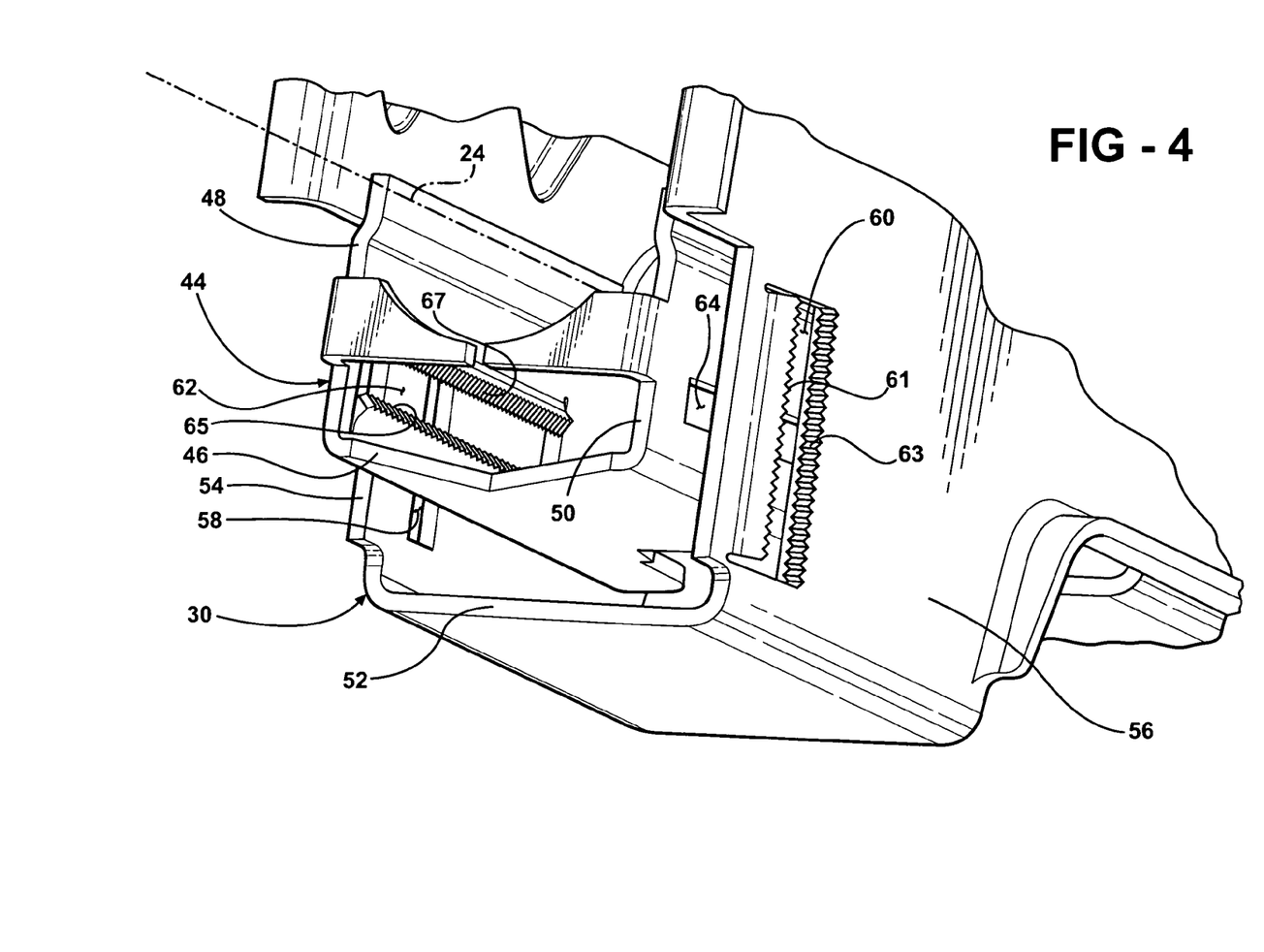
FIG. 4 is a perspective view of a shuttle portion and a bracket of the assembly with other parts removed to show internal detail.
Figure 5:
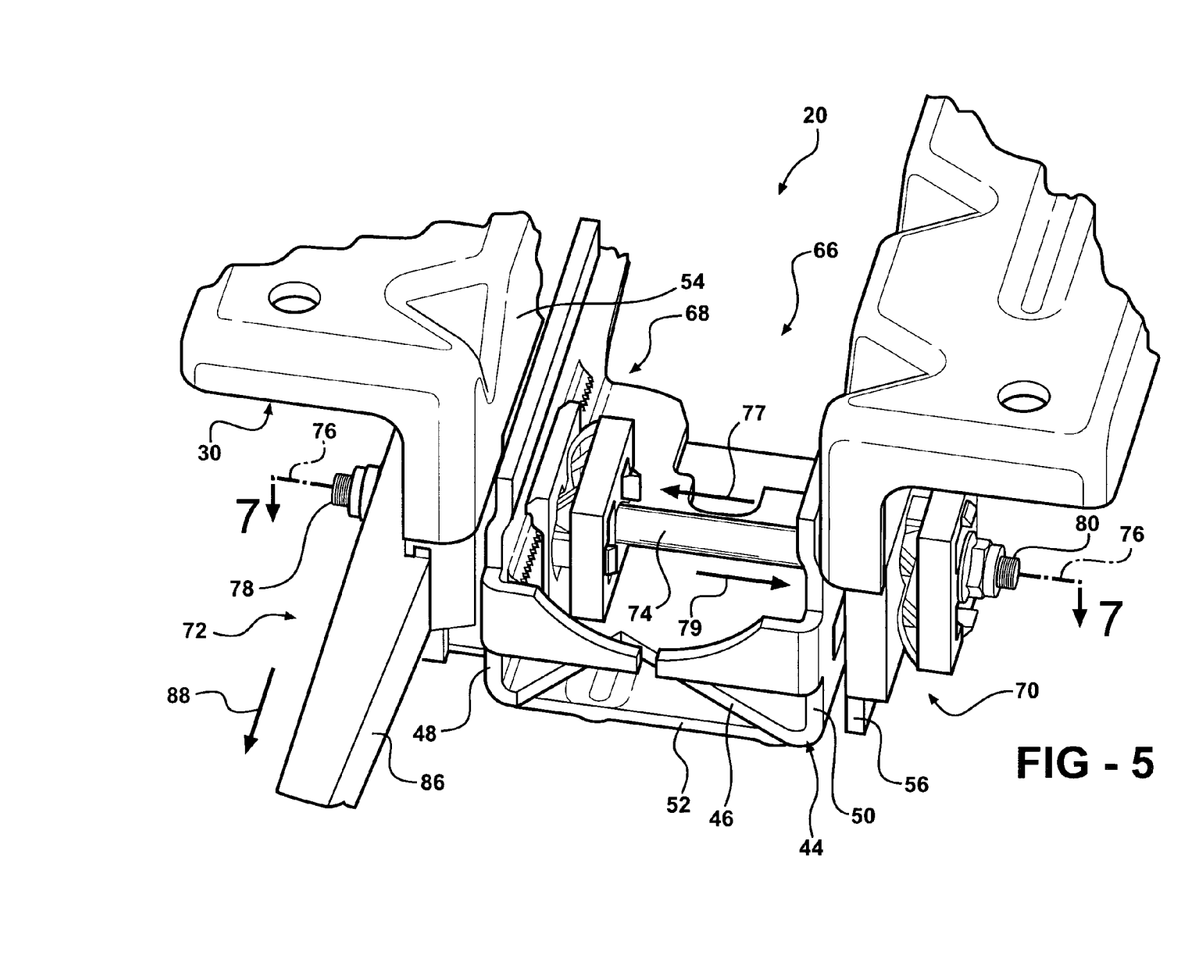
FIG. 5 is a partial perspective view of the steering column assembly illustrating longitudinal and tilt indexing apparatuses of a central lock device of the assembly.

As best illustrated in FIGS. 1 and 4, the housing 28 has a substantially tubular portion 42 that surrounds and rotatably supports the rotating steering shaft 22, and a support shuttle portion 44 that projects downward from the tubular portion 42. The shuttle portion 44 is at least in-part located in the bracket 30 and is supported operably by the bracket. The shuttle portion 44 has a cross section that generally forms an upright U-shape having a bottom wall 46 and two opposite side walls 48, 50 that project upward from the bottom wall 46 to rigidly connect to the tubular portion 42. Correspondingly and as best shown in FIG. 5, the bracket 30 has a bottom panel 52 located immediately beneath the bottom wall 46 of the shuttle portion 44 and two opposite side panels 54, 56 projecting upward from the base panel 52 to preferably engage the vehicle chassis via the shear pins 32. With respect to axis 24, the side panels 54, 56 are located immediately outward from the respective side walls 48, 50 of the shuttle portion 44. Preferably, the side walls 48, 50 and side panels 54, 56 span substantially vertically and are substantially parallel to one another.

A substantially vertical first slot 58 is located in the first side panel 54 of the bracket 34 and a substantially vertical second slot 60 is located in the second side panel 56 of the bracket 34, both slots 58, 60 enable tilting movement of the housing 28 between the tilt down and tilt up states 38, 40. The second slot 60 is defined by opposing longitudinal sides 61, 63 carried by the side panel 56. Preferably, the first side panel 54 that defines the first slot 58 is generally smooth (i.e. is not indexed), and the second side panel 56 is raked or indexed adjacent to the second slot 60 at opposing sides 61, 63 for selection of a tilt position. For telescoping or longitudinal movement of the assembly 20 between the retracted and extended positions 34, 36, a substantially horizontal third slot 62 is in the first side wall 48 and generally crosses or communicates laterally with the first slot 58, and a substantially horizontal fourth slot 64 is in the second side wall 50 and generally crosses or communicates laterally with the second slot 60. The third slot 62 is defined by opposing longitudinal sides 65, 67 carried by the side wall 48. Preferably, the second side wall 50 that defines the fourth slot 64 is generally smooth (i.e. is not indexed), and the first side wall 48 is indexed adjacent to the third slot 62 and at sides 65, 67 for selection of a longitudinal or extended/retracted position of the assembly 20.

Referring to FIGS. 1, 4 and 5, the assembly 20 has a central lock device 66 that has a first indexing apparatus 68 for adjusting and locking the longitudinal position of the assembly 20, preferably a second indexing apparatus 70 for adjusting and locking the tilt state of the assembly 20, an push/pull actuator 72, and a linking carrier or rod 74 that operably links both indexing apparatuses 68, 70 to the common actuator 72. The elongated carrier 74 extends through all four slots 58, 62, 64, 60 along a first centerline 76 that is substantially perpendicular to the axis 24 and preferably spaced below the steering shaft 22 and tubular portion 42 of the housing 28. The actuator 72 engages a first end 78 of the carrier 74 located outward from the first side panel 54 of the bracket 30. The carrier 74 generally carries at least in part the first indexing apparatus 68 at a location between the first and second side walls 48, 50 of the shuttle portion 44, and an opposite second end 80 of the carrier 74 connects and carries at least in part the second indexing apparatus 70 and at a location outward from the second side panel 56 of the bracket 30.

The indexing apparatuses 68, 70 may be any variety of indexing apparatuses capable of operating with the carrier 74 that moves along the first centerline 76 and in a first direction 77 to place the device 66 in a locked position 82 and in an opposite second direction 79 to place the device 66 in an unlocked position 84. When in the locked position 82, the first end 78 of the carrier 74 is preferably distant from the first side panel 54 of the bracket 30 (see FIGS. 6 and 7), and when in the unlocked position 84, the first end 78 is closer to or in the proximity of the first side panel 54 (see FIGS. 6 and 8). One such pair of indexing apparatuses 68, 70 is taught in U.S. patent application Ser. No. 11/726,209 (U.S. Publication No. 2008-0231030-A1), titled: A Rocker-arm Lock Device of an Adjustable Steering Column Assembly, filed on the same day as the application for the present invention with a common assignee, and incorporated herein by reference in its entirety.

Referring to FIGS. 1 and 6-11 and more specific to the present invention, in the preferred embodiment of the actuator 72 of the lock device 66, the actuator has an elongated lever 86 that may project in a rearward direction 88 with respect to the vehicle and toward the driver, and generally along a centerline 90. The lever 86 may be manually actuated in a linear direction along its centerline 90 that generally remains substantially parallel to axis 24 regardless of longitudinal positions 34, 36 and regardless of states 38, 40. Because movement and projection of the lever 86 is substantially parallel to steering axis 24, the lever 86 is generally central to the assembly 20 as opposed to known levers that project radially with respect to a steering shaft and that generally pivot in an imaginary plane that traverses the steering axis. Manual movement of the lever 86 from the unlocked position 84 and toward the locked position 82 may act against an axial biasing force generally exerted by springs of the indexing apparatuses 68, 70 and with respect to centerline 76.

Figure 6:
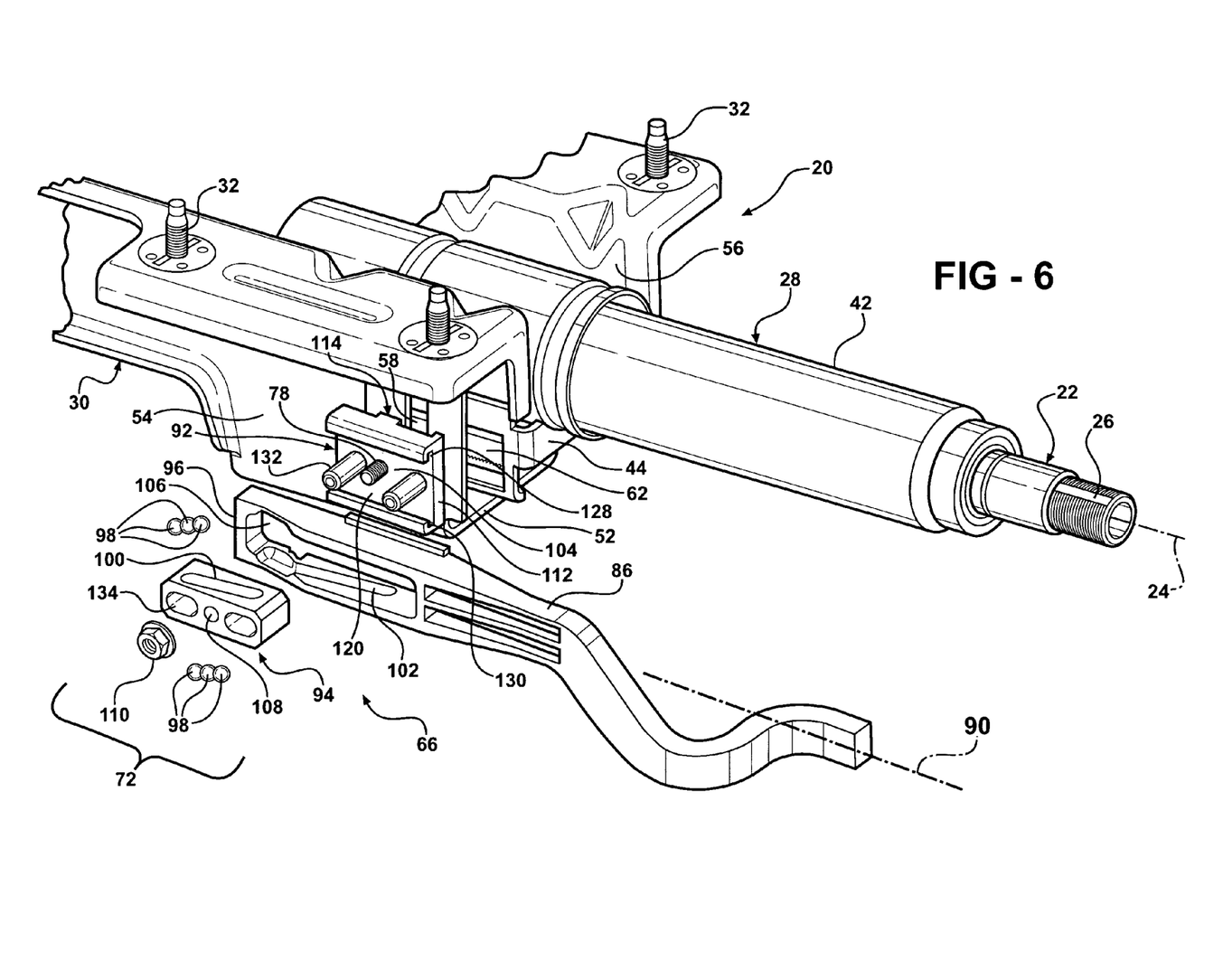
FIG. 6 is an exploded perspective view of a push/pull actuator of the central lock device.
Figure 9:
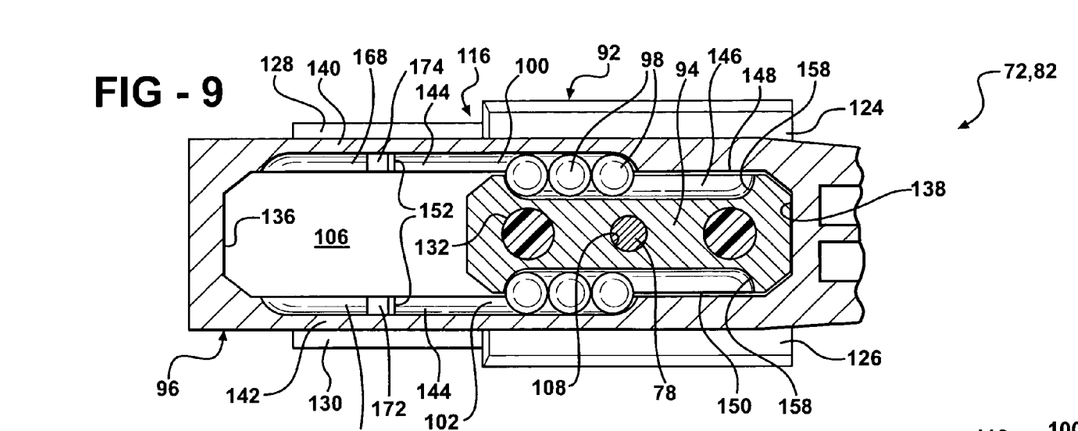
FIG. 9 is a partial cross section of the push/pull actuator taken along line 9-9 of FIG. 7.
Figure 10:
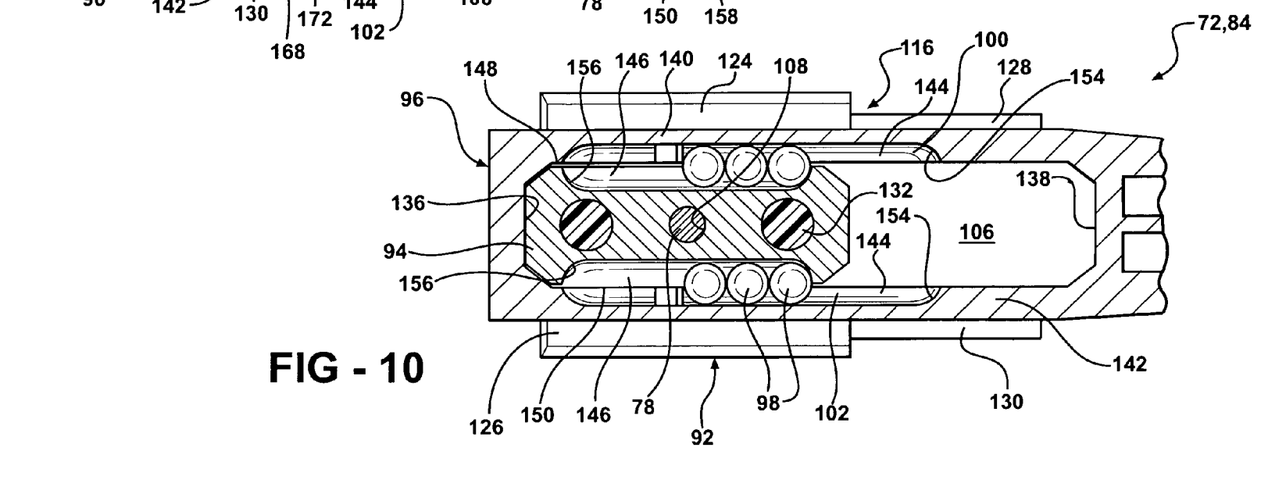
FIG. 10 is a partial cross section of the push/pull actuator taken along line 10-10 of FIG. 8.

Referring to FIGS. 6 and 9-10, to divert or convert motion along the centerline 90 of the lever 86 to motion along the traversing centerline 76 of the carrier 74, the actuator 72 has an inner member or block 92 located and preferably supported slidably by the bracket 30, an outer member 94 engaged rigidly to the end 78 of the carrier 74 and a plurality of ball bearings 98 distributed between two linear upper and lower raceways 100, 102 defined between the outer member 94 and the end portion 96 of the lever 86. The carrier 74 projects longitudinally through a bore 104 in the inner member 92, an oblong hole 106 elongated along the centerline 90 and disposed in the end portion 96 of the lever 86, and preferably threaded through a threaded bore 108 in the outer member 94. The end 78 of the carrier 74 projects outward from the outer member 94 and may thread to a lock nut 110. The carrier or rod 74 slides through the bore 104 as the carrier 74 moves along centerline 76 between the locked and unlocked positions 82, 84. The close relationship between the inner member 92 and the sliding rod 74 acts as a bushing to prevent misalignment of the device 66.

Figures 7, 8:
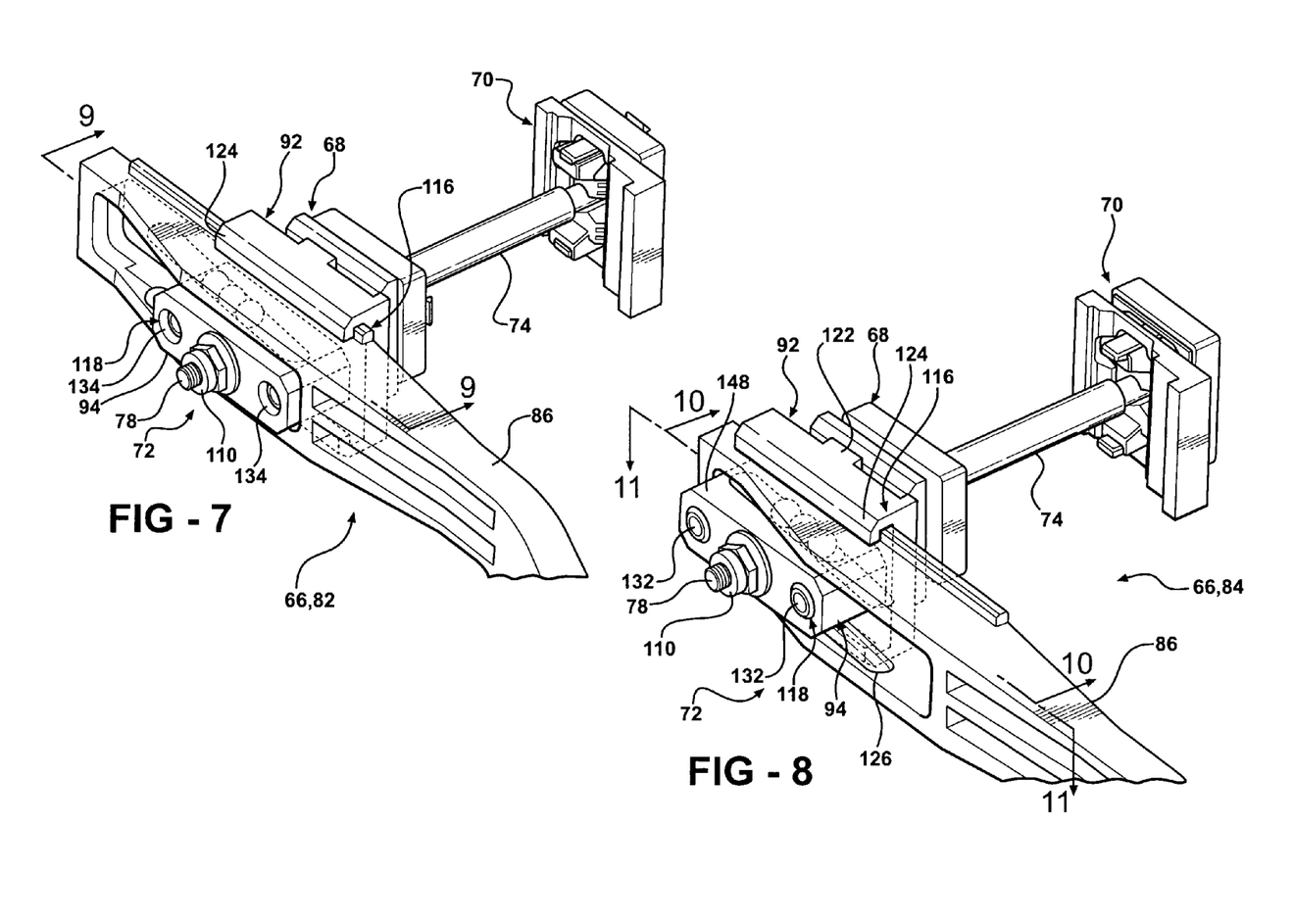
FIG. 7 is a perspective view of the central lock device with structure removed to show internal detail and illustrated in a locked position.
FIG. 8 is a perspective view of the central lock device with structure removed to show internal detail and illustrated in an unlocked position.

Referring to FIG. 6-8, the inner member 92 has a planar base portion or plate 112 disposed perpendicular to centerline 76 and that generally supports in-part three guide features 114, 116, 118 for three-dimensional movement of the actuator 72. As best shown in FIG. 6, guide feature or guide track 114 is carried between an inner side of the plate 112 and the bracket 30 at the slot 58 for substantially vertical movement of the actuator 72 during tilt adjustment of the steering column assembly 20. As best shown in FIGS. 7-8, guide feature or guide rail 116 is carried between an opposite outer side 120 of the plate 112 and the end portion 96 of the lever 86 for movement of the lever 86 along the centerline 90. And, guide feature 118 is carried between the outer member 94 and the outer side 120 of the plate 112 for movement of the outer member 94 and the carrier 74 along the centerline 76.

The guide track 114 preferably has a vertically elongated projection 122 of the inner member 92 that projects laterally into the slot 58 for sliding vertical movement of the inner member 92 and thus the actuator 72 with respect to the bracket 30. The guide track 114 generally prevents or restricts movement of the inner member 92 when the assembly 20 is moving between longitudinal positions 35, 37, and enables guided vertical movement of the push/pull apparatus 48 when the assembly 20 is moving between tilt states 38, 40.

Referring to FIGS. 6-10, the guide rail 116 preferably has two opposing upper and lower rails 124, 126 of the inner member 92 that both extend parallel to the centerline 90. Each rail 124, 126 is substantially L-shaped in cross section and project in-part laterally outward from the outer side 120 of the plate 112. Along with the outer side 120, the rails 124, 126 define respective grooves 128, 130 that are opened laterally for opposing communication with one-another. The guide rail 116 further has a pair of ribs 128, 130 of the end portion 96 of the lever 86 that project laterally outward in opposite directions for sliding receipt in respective grooves 128, 130. The guide track 116 maintains the end portion 96 at a consistent distance from the panel 54 of the bracket 30 (i.e. the thickness of plate 112) and when the lock device 66 is moving between the locked and unlocked positions 82, 84.

Referring to FIGS. 7-8, the guide feature 118 preferably has two guide pins 132 of the inner member 92 that project outward from the outer side of the plate 112. Both pins 132 are parallel to centerline 76 and are located in respective bores 134 in the outer member 94 for sliding engagement of the pins 132 with the outer member 94. For even distribution of forces, the bores 134 are diametrically opposed to one another with respect to threaded bore 108 and centerline 76. The guide feature 118 enables sliding of the outer member 94 along the centerline 76 and as the device 66 moves between the locked and unlocked positions 82, 84 and prevents movement of the second member 94 along the centerline 90.

Referring to FIGS. 9 and 10, the end portion 96 of the lever 86 has a forward stop 136 for generally establishing the unlocked position 84 along the centerline 90, an opposite rearward stop 138 for generally establishing the locked position 82 along the centerline 90, an upper leg 140, and a lower leg 142. The legs 140, 142 are parallel to one another and extend along centerline 90 and between the stops 136, 138. The legs 140, 142 and axially opposing stops 136, 138 generally define the oblong hole 106 through which the second member 94 projects. The upper and lower raceways 100, 102 are divided or bisected lengthwise, each having first and second channels 144, 146 that laterally communicate with and shift with respect to one-another. The first channels 144 of the upper and lower raceways 100, 102 is defined by the respective first and second legs 140, 142 and communicate with the oblong hole 106. The second channels 146 of the upper and lower raceways 100, 102 are defined by respective and opposite side faces 148, 150 of the outer member 94.

As previously described in-part and best shown in FIG. 9-10, three rollers or rolling ball bearings 98 are located in each raceway 100, 102 for reducing friction between the side faces 148, 150 of the second member 94 and the respective legs 140, 142 of the end portion 96, and for generally restricting and diverting motion along the centerline 90 to motion along the centerline 76. With respect to the vehicle, each channel 144 in the legs 140, 142 of the lever 86 has a forward end 152 and an opposite rearward end 154, and each channel 146 in the second member 94 has a forward end 156 and an opposite rearward end 158. When the actuator 72 is in the locked position 82, the leading rollers 98 are at the leading ends 156 of the second channels 146 in the second member 94 and the trailing rollers 98 are at the trailing ends 154 of the first channels 144 in the respective legs 140, 142 of the lever 86. When the actuator 72 is in the unlocked position 84, the leading rollers 98 are at the leading end 152 of the first channels 144 and the trailing rollers 98 are at the trailing ends 158 of the second channels 146.

Figure 11:
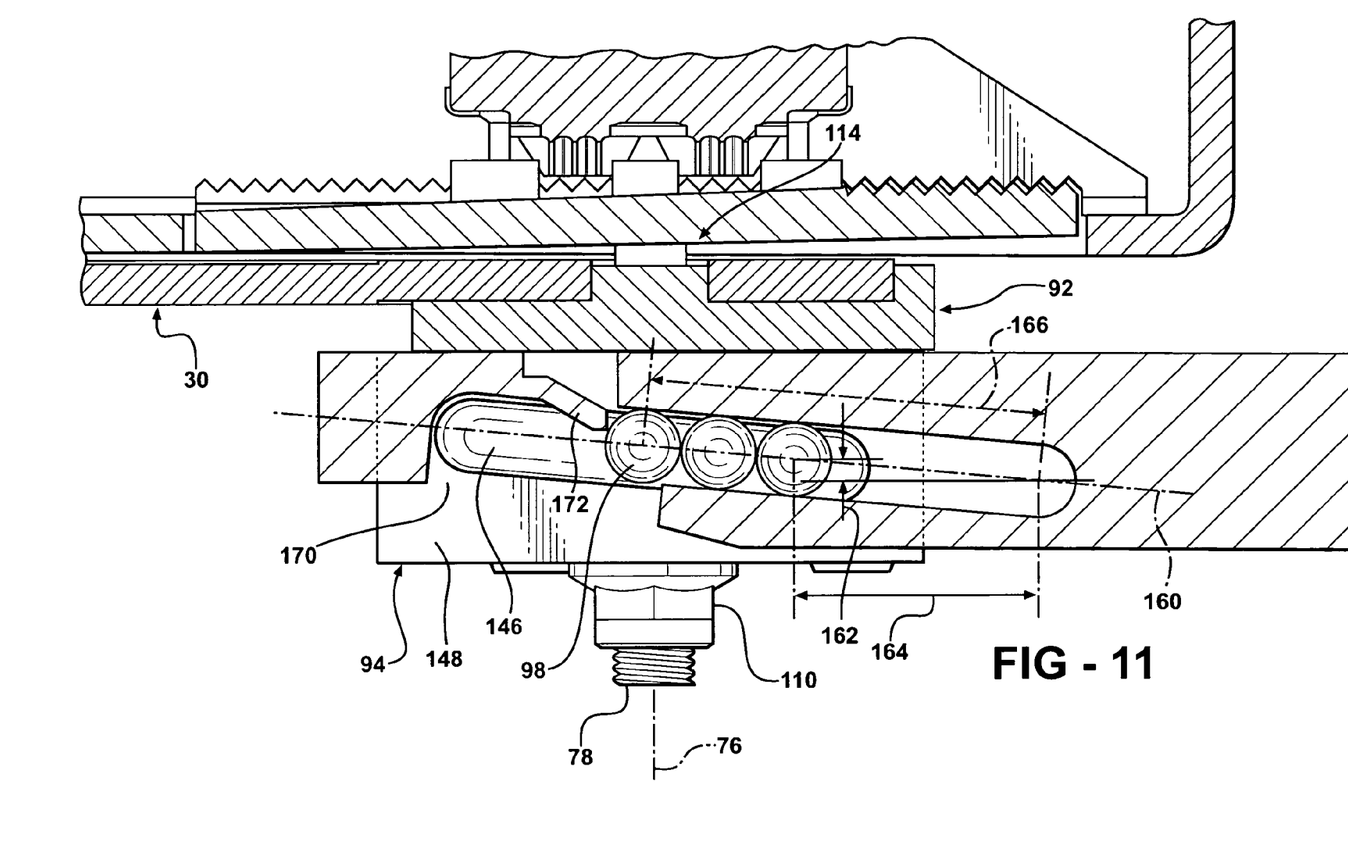
FIG. 11 is a partial cross section of the push/pull actuator taken along line 11-11 of FIG. 8.

Referring to FIG. 11, preferably the first and second channels 144, 146 of each raceway 100, 102 are substantially equal in length to one-another and communicate with one another laterally and along a common imaginary plane or centerline 160 that traverses both the centerline 76 of the carrier 74 and the centerline 90 of the lever 86. Preferably, the leading ends 156 of the second channels 146 are closer to the first member 92 than the trailing ends 158 by a distance 162 that is substantially equal to or slightly greater than the throw of the carrier 74 along centerline 76. With the lever 86 having a throw or moving a distance 164 between positions 82, 84, a length or distance 166 of the channels 144, 146 is about equal to the sum of all three diameters of the rollers 98 plus the square root of the summed squares of distance 162 and distance 164.

Referring to FIGS. 9 and 11, preferably and for assembly purposes, an insertion channel 168 extends longitudinally forward of each first channel 144 of each raceway 100, 102. Each insertion channel 168 has a side egress opening 170 communicating directly with the hole 106 and having a longitudinal width preferably slightly greater than the summed diameters of all the rollers 98. A resiliently flexible tab 172 is disposed axially between the insertion channel 168 and associated first channel 144. During assembly, the rollers 98 are first inserted into the second channels 146 in the second member 94. The staged rollers 98 are then aligned to the opening 170 and the end portion 96 of the lever 86 is slid laterally over the second member 94 and until the rollers 98 are generally in the insertion channel 168 with the tab 172 flexed radially outward. Movement of the lever 86 along centerline 160 will then cause the rollers 98 to roll past the tab 172 and into the first channel 144 whereupon the tab 172 resiliently snap backs to define forward end 152.

During operation of the lock device 66, the indexing apparatuses 68, 70 are simultaneously placed in the unlocked position 84 (as best shown in FIG. 8) when the driver desires to longitudinally and/or tiltably adjust the steering housing 28. The lock device 66 is placed in the locked position 82 (as best shown in FIG. 7) after the driver has selected a desirable position and state for the steering wheel. In order to move the device 66 between the unlocked and locked positions 84, 82, the driver respectively pulls and preferably pushes upon the lever 86 of the actuator 72. When the lever 86 of the push/pull actuator 72 of the lock device 66 is pulled by the driver, and rearward toward the driver, the second member 94 moves along centerline 90 and away from stop 136 of the lever 86. With continued pulling of the lever 86 and with the biasing assistance of the springs of the respective indexing apparatuses 68, 70, the device 66 is preferably placed in the unlocked position 84 generally designated when the second member 94 abuts the rearward stop 138 of the lever 86.

During this pulling action, the ball bearings 98 generally shift from the rearward ends 154 of the first channels 144 and toward the forward ends 152. Simultaneously, the ball bearings 98 are also shifting from the forward ends 156 of the second channels 146 and toward the rearward ends 158. This throw 164 of the lever 86 and the shifting of the ball bearings 98 in the raceways 100, 102 cause the second member 94 with the carrier 74 to move along the centerline 76 by the distance 162, which is great enough to release the indexing apparatuses 68, 70. If a tilt adjustment is desired by the driver, the guide feature 114 enable vertical movement of the push/pull apparatus along slot 58 in the bracket 30.

When the desired longitudinal position and tilt state of the assembly 20 is selected, the lever 86 of the actuator 72 is pushed by the driver, and forward away from the driver, against the biasing force of the springs of the respective indexing apparatuses 68, 70 and until the second member 94 abuts the stop 136 of the lever 86. During this pushing action, the ball bearings 98 move in the opposite direction along centerline 160 of the raceways 100, 102 and as previously described. As the ball bearings 98 move, the lever 86 is prevented from moving laterally outward and along centerline 76 by the guide feature 116, and while the second member 94 is guided by the guide feature 118 and moves outward along the centerline 76 by the distance or throw 162.

One skilled in the art would now know that if the assembly 20 generally did not include the tilt indexing apparatus 70, there would be no need for the vertical slots 58, 60 in the bracket 30. Moreover and because the inner member 92 of the push/pull actuator 72 would no longer require a sliding relationship with the bracket 30, there would be no need for the guide feature 114, thus the inner member 92 may be an integral part of the bracket 30. One skilled in the art would now know that the push to lock and pull to unlock operation of the device 66 can be reversed (i.e. push to unlock and pull to lock) by changing the angle of line 160 (see FIG. 11) to generally a mirror or reverse image from that illustrated.

Figure 12:
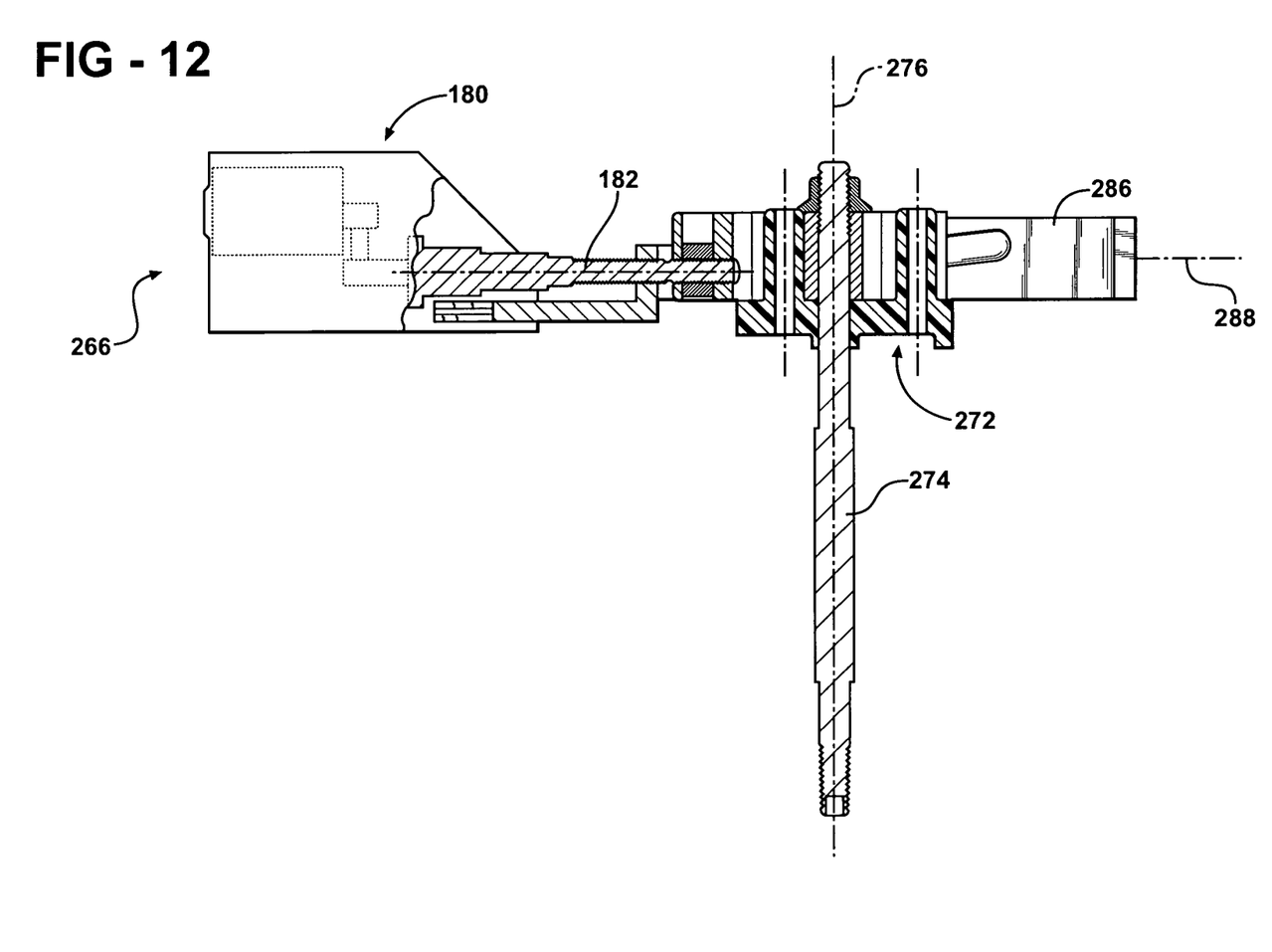
FIG. 12 is a cross section of a second embodiment of a central lock device of an adjustable steering column assembly.

Referring to FIG. 12, a second embodiment of a central lock device 266 is illustrated wherein like elements to the first embodiment have the same identifying numerals except with the summed addition of two hundred. Unlike device 66 that is generally manual, device 266 has a reversible electric motor 180 with a motor housing engaged rigidly to a steering column housing (not shown) of the vehicle. The motor 180 has a rotating shaft or turn buckle 182 that extends substantially parallel to a steering column or a rotation axis of a steering shaft (not shown). A lever 286 of the device 266 is threaded to the shaft 182 forming a screw and nut mechanism for movement of the lever 286 between locked and unlocked positions along a centerline or direction 288 causing an actuator 272 to move a carrier 274 along a centerline 276 that is substantially perpendicular to centerline 288.

While the forms of the invention herein disclosed constitute presently preferred embodiments, many others are possible. For instance, the rollers 98 may be cylindrical rollers as oppose to sperical. It is not intended herein to mention all the possible equivalent forms or ramifications of the invention. It is understood that terms used herein are merely descriptive, rather than limiting, and that various changes may be made without departing from the spirit or scope of the invention.

The invention claimed is:

1. An adjustable steering column assembly for a vehicle comprising:
   a stationary bracket for engagement to the vehicle;
   a housing supported adjustably by said bracket;
   a steering shaft jounaled to said housing;
   a first member supported at least in-part by said bracket;
   a second member supported at least in-part by said first member;
   a first indexing apparatus carried between said second member and said housing for longitudinal adjustment of the steering column assembly;
   a lever connected operably to said second member;
   a first guide feature carried between said lever and said first member, movement of said lever along a first centerline being guided by said first guide feature; and
   a second guide feature carried between said first and second members, movement of said second member along a second centerline that traverses said first centerline and as said lever moves along said first centerline being guided by said second guide feature;
   wherein said first guide feature has a pair of L-shaped rails projecting outward from a plate of said first member, a pair of opposing grooves defined by said respective rails and said plate and extending parallel to said first centerline, and a pair of ribs projecting laterally outward from said lever for sliding receipt in said respective grooves.

2. The adjustable steering column set forth in claim 1 wherein said second guide feature has at least one guide pin projecting outward from said plate and being parallel to said second centerline, and at least one bore in said second member for sliding receipt of said respective at least one guide pin.

3. A central lock device for an adjustable steering column assembly of a vehicle having a steering shaft rotatable about an axis and a co-extending housing journaled to the shaft and engaged operably to a bracket, the central lock device comprising:
   an outward member constructed and arranged for movement along a first centerline traverse to the axis;
   an inward member;
   a lever constructed and arranged for movement along a second centerline that intersects said first centerline, said lever located outward from said inward member with respect to the axis and having opposing and longitudinally extending legs, an oblong hole in said lever being defined in-part by said legs;
   a carrier;
   at least one roller located rotatably in a first raceway defined between said outward member and said lever, wherein said first raceway is angled with respect to said first and second centerlines;
   at least one roller located rotatably in a second raceway defined between said outward member and said lever, said second raceway parallel to said first raceway, said carrier extending between said first and second raceways;
   a guide track carried in-part by said lever for guiding movement of said lever with respect to the bracket and along said second centerline as said outward member moves along said first centerline; and
   a guide rail carried in-part by said inward member for unified movement of said lever, said inward member, said outward member and said carrier in a direction substantially perpendicular to said first and second centerlines;
   wherein said outward member extends through said oblong hole for sliding movement against said opposing legs.

4. The central lock device set forth in claim 3 wherein said first and second raceways are defined in-part by said respective first and second legs.

5. The central lock device set forth in claim 4 further comprising:
   at least one guide pin disposed parallel to said first centerline and projecting outward from said inward member; and at least one bore in said outward member for sliding receipt of said respective at least one guide pin for restricted movement of said outward member along said first centerline.

6. A central lock device for an adjustable steering column assembly of a vehicle having a steering shaft rotatable about an axis and a co-extending housing journaled to the shaft and engaged operably to a bracket, the central lock device comprising;

an outward member constructed and arranged for movement along a first centerline traverse to the axis;

an inward member;

a lever constructed and arranged for movement along a second centerline that intersects said first centerline, said lever located outward from said inward member with respect to the axis;

a carrier;

at least one roller located rotatably in a first raceway defined between said outward member and said lever, wherein said first raceway is angled with respect to said first and second centerlines;

a guide track carried in-part by said lever for guiding movement of said lever with respect to the bracket and along said second centerline as said outward member moves along said first centerline; and a guide rail carried in-part by said inward member for unified movement of said lever, said inward member, said outward member and said carrier in a direction substantially perpendicular to said first and second centerlines;

wherein said first raceway has and extends between a first end and an opposite second end; and wherein one of said first and second ends is closer to said inward member by a distance equal to at least a throw distance of said outward member than said other of said ends.

7. The central lock device set forth in claim 6 wherein the outward member moves along said first centerline by said throw distance and when moving between a locked position and an unlocked position.

8. The central lock device set forth in claim 6 further comprising:

said raceway having a longitudinal first channel defined by said lever and a longitudinal second channel defined by said member;

wherein the first channel has a first end and an opposite second end carried by the lever;

a resilient flex tab projecting from said lever and carrying said first end; and an insertion channel in the lever and co-extending with said first channel from said flex tab, said insertion channel having a side opening for receipt of said at least one roller during assembling.

* * * * *